United States Patent Office 2,806,895
Patented Sept. 17, 1957

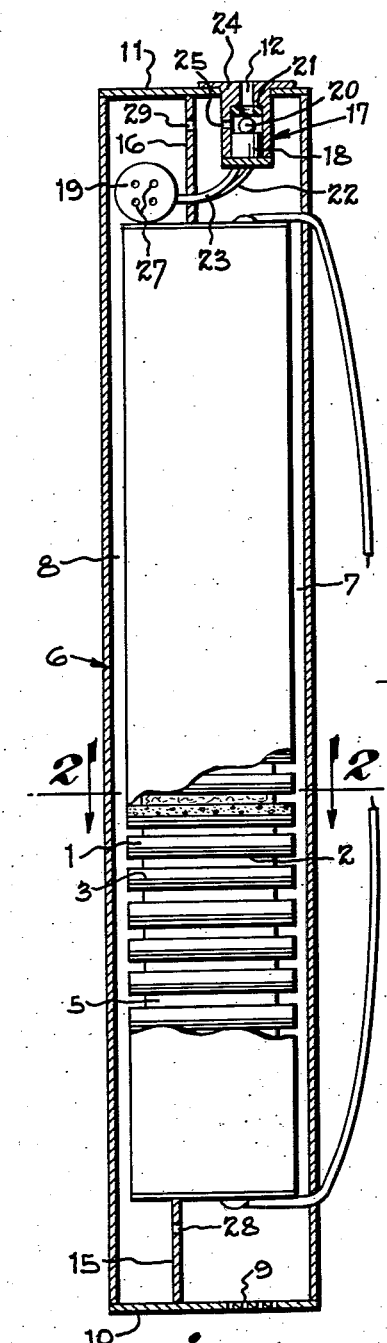
Fig. 1
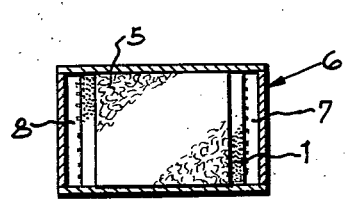
Fig. 2
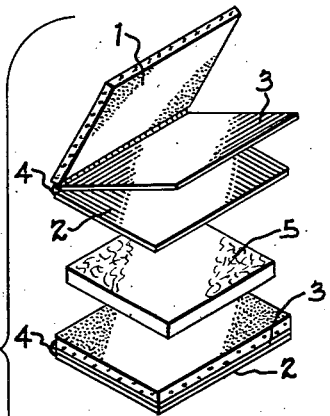
Fig. 3
INVENTOR.
James M. Dines
BY
Wood, Herron & Evans.
ATTORNEYS.
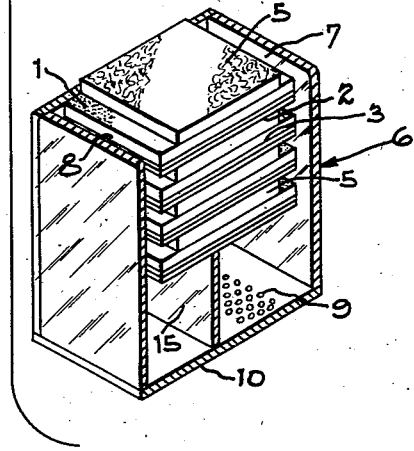

2,806,895

IMMERSION TYPE BATTERY

James M. Dines, Joplin, Mo., assignor to The Eagle-Picher Company, Cincinnati, Ohio, a corporation of Ohio Application September 23, 1955, Serial No. 536,073

7 Claims. (Cl. 136—90)

This invention relates to immersion type electric batteries. It is directed particularly to a primary battery adapted to provide relatively high voltage promptly and efficiently in response to immersion in a liquid electrolyte such as fresh water or sea water. The invention is also addressed to a battery of this type in which the battery elements occupy a minimum of space, as is frequently required for military purposes.

The battery of the present invention consists generally of individual cells arranged facially adjacent one another such as in a stack, each cell comprising a positive electrode, a negative electrode, and a bibulous separator therebetween which is adapted by absorption or capillarity to hold electrolyte in electrochemical contact with the respective electrodes whereby a voltage is developed. The cells may be connected either in parallel or series as desired, but this invention is disclosed particularly in relation to the series-type intercell connection, through which 200 to 750 volts or more may be furnished, depending upon the number of cells and the particular electrolytic couple which is chosen.

Various types of couples, which in themselves form no part of the present invention, may be utilized in the practice of the invention, such as magnesium-silver chloride, magnesium-cuprous chloride, and others of which the art is generally familiar. Also, in this specification either fresh water or sea water is referred to as the electrolyte, since the batteries most commonly are constructed for such type of service, but it will be understood that liquid other than fresh or sea water may be used if or as required by the particular type of couple chosen for use.

The bibulous pads employed in immersion type cells generally are of absorptive material such as viscose fiber, cotton fiber, or the like. Where space limitations constitute an important factor in relation to the ultimate usage of the assembly, the thickness of the separator is of considerable importance. For example, other factors being equal, if the thickness of the separator is doubled, so also, approximately, is the net volume of the assembly. It is apparent, therefore, that where space is at a premium, a separator will be chosen which is as thin as possible consistent with its capability of absorbing and holding the amount of electrolyte required to serve the electrodes throughout their useful period of life.

Since the cells in a typical multi-cell pile construction are arranged facially adjacent one another, electrolyte may enter the separators primarily from the exposed edgewise portions thereof. Thus, when a cell having only its edges exposed is immersed, the electrolyte passes by capillarity, adsorption and/or absorption from the edges toward the center. As the water is absorbed into the separator, air is displaced, provided it can readily escape. However, if a cell is exposed at all edges of its periphery, the water paths tend to converge in the central portion of the separator; hence, air cannot escape freely from the separator, but rather it becomes entrapped within the pad thereby reducing the cell capacity to the extent of the area over which the electrodes are insulated thereby from wetting contact with the electrodes. This entrapment of air in the separators is particularly acute when the separators are quite thin, as for example .020 inch thick, although it prevails to a degree in all types of separator pads.

The objective of this invention has been to provide an immersion type battery wherein air normally present in a separator when it is dry is flushed freely from the separator as electrolyte advances through it. Otherwise expressed, the invention is directed particularly to an immersion type battery having means effectively preventing entrapment of air within thin separators, such that batteries which are small in over-all size may be produced which nevertheless will operate reliably at designed capacity when electrolyte is introduced.

It has been discovered that impairment of battery capacity by the insulating effect of air entrapped in thin bibulous pads of immersion type cells is effectively eliminated by causing electrolyte to flow along a generally unidirectional path within the plane of the separator from one edge to an opposed edge. This may be accomplished by blocking two opposite, edgewise portions of a cell, while admitting electrolyte to one of the unblocked edges and allowing air which would otherwise be entrapped to escape from the other unblocked edge.

Immersion of the battery to cause wetting of the bibulous separators in the manner just described provides prompt and efficient activation of the cells, and the designed voltage of the battery is developed over a short period of time. However, sustained immersion during use is contemplated, and especially when the voltage is high, the presence of a copious supply of electrolyte across the electrodes after activation causes severe intercell short circuiting, especially if the electrolyte is saline. Hence, while it is desirable to provide an ample supply of electrolyte from which the bibulous separators readily may be wetted to activate the battery, it is requisite subsequently to remove excess electrolyte to avoid short circuiting across the electrodes.

In the practice of this invention, an inlet conduit or manifold is utilized which admits electrolyte freely to the cell pads. An outlet conduit or manifold communicating with the opposite edgewise portions or areas of the cell pads is provided to facilitate escape of air which would otherwise be entrapped in the pads, but the battery also includes means for closing the outlet through which air normally escapes during filling, such that normal gasing of the battery which occurs subsequent to wetting of the cells will cause excess electrolyte to be expelled. Such electrolyte may be discharged from the battery either through an opening at the bottom of the manifold which previously has served as a gas outlet manifold, or back through the cell separators, thence out through the inlet manifold, returning generally along the same path which it entered. This gas expulsion principle is utilized by providing water inlet and outlet manifolds or waterways which are in common communication with edgewise portions or areas of the bibulous pads at relatively opposite portions or areas on the periphery thereof while the intermediate edgewise portions of the pads are substantially sealed or blocked against liquid penetration.

A typical embodiment of this invention is shown in the accompanying drawings in which:

Figure 1 is a cross-sectional elevation of an immersion battery of elongated type;

Figure 2 is a sectional view taken on the line 2—2 of Figure 1 showing elements of the battery cell and case in plan view; and Figure 3 is an exploded view showing elements of the assembly in perspective relation to one another.

A typical individual cell of the type adapted to be used in accordance with this invention for activation by sea water is one made up of a positive electrode comprising cuprous chloride pasted onto a bronze or copper wire screen, a negative electrode comprising sheet magnesium, and a bibulous separator interposed between the respective electrodes. The positive and negative electrodes may be of rectangular form, for example, approximately 1¼ inches long by 11/16 of an inch wide. The bibulous separator may be the same width but is only approximately one inch long, such that the side edges of the separator will be substantially flush with the side edges of the electrodes, but the end edges of the separator will be spaced inwardly from the electrode ends approximately ⅛ of an inch when the elements are stacked as shown. As many cells of this type, stacked facially one upon the other, are employed as are necessary to provide the output energy required.

In a preferred commercial structure, series electrical connections between one cell and another required to build up a relatively high voltage are provided by welding or by other electrically conductive attachment of the cuprous chloride positive of one cell to the magnesium negative of an adjacent cell, preferably with a piece of thin copper sheeting disposed between the two. Thus, as shown in Figure 3, a positive electrode 1, a magnesium negative electrode 2, and a copper sheet 3 are joined conductively along a common edge 4. The magnesium negative electrode of this assembly is placed facially adjacent one face of the bibulous separator 5. A positive electrode of a similar assembly is placed against the other side of the separator 5. This stacking arrangement is repeated to provide the number of cells desired, the endwise positive and negative electrodes constituting the output terminals of the battery.

A stack of cells of the type illustrated in Figure 3 is placed within a case, indicated generally at 6. The case 6 is preferably of tubular configuration, fabricated from molded or sheet plastic material such as polystyrene. The cells extend crosswise of the case, and the case, in overall length, may be somewhat longer than the stack of cells. Also, in the preferred construction, the case cross-sectionally is so dimensioned that two of its opposed, inside faces are spaced apart a distance approximately equal to the width across the flush edges of the cell components such that the edges of the latter reside closely adjacent the former, thereby blocking such edges. The other opposed walls of the case are spaced apart a distance somewhat greater than the length of the cells, such that when the cells are placed centrally in the case, spaces between the ends of the cell components and the side walls are provided. These spaces, designated 7 and 8, respectively constitute waterways or conduits which are in common communication with the edgewise portions of the bibulous separators at their respective ends. The ends of the case are closed by end walls 10 and 11.

In the construction illustrated, waterway 7 constitutes an inlet passage. To admit water, the lower end of the case, 10, that is, the end which is normally lowermost when the assembly in "dunked," is provided with an inlet aperture 9, which may either be a single opening or a plurality of small apertures which collectively provide an opening of substantial area through which water may pass freely.

At the top of the case, an outlet passage 12 is provided. This passage is normally open; hence, water may rise freely through the inlet 9 and up the waterway 7, the air contained in the casing per se passing out through the opening 12 as water enters.

For the moment, ignoring the baffles 15 and 16 which are installed at the bottom and top of the case and which are described in detail at a later point in the specification, it will be seen that as water rises in conduit 7, it advances through the bibulous separators 5 along paths substantially in the planes thereof toward the waterway 8. As it does so, air normally contained in the interstices of the separator material is expelled and passes out into the waterway 8. Also as the separators themselves become saturated then, under the hydrostatic pressure of the water in the head column 7, water accumulates in the waterway 8 and rises therein. At the top of the case, outlet opening 12 is provided with a normally open valve indicated generally at 17 which, when operated, is effective to close the outlet opening. In the construction shown, the valve is operated by a so-called dimple motor 18 which is energized from a separate battery 19 located at or adjacent the top of the case, that is, at a point at which it will not be exposed to water for activation until all the cells have been wetted.

The dimple motor 18 may comprise a small explosive charge within which is embedded a wire filament, not shown, which, when electrically heated by reason of its own resistance, ignites the charge and thereby causes the upper end of the dimple motor to bulge upwardly sufficiently to drive valve ball 20 against valve seat 21 which is arranged directly over the inner end of the outlet passage 12. The dimple motor 18, connected to the trigger battery 19 by leads 22 and 23, conveniently may be mounted in a plug 24 which is bored to provide the outlet 12 and which is counter-bored to house the dimple motor 18. As shown, plug 24 contains an aperture 25 which communicates with the outlet 12 when the valve is open.

Battery 19 may comprise a small magnesium cuprous chloride cell of the same general type as previously described but proportioned to provide the energy appropriate to energize the dimple motor, or may be of other suitable construction. Also, water is admitted to the battery 19 in any suitable way, as for instance through apertures 27 which are provided in its case.

When the column 8 becomes filled with water, the trigger battery 19 becomes wetted and thereby is activated to operate the dimple motor 18 which forces the ball 20 against the outlet seat 21 so as to close the outlet opening. As the main cells are activated, gas is liberated; for instance, hydrogen gas forms at the cuprous chloride positive in a magnesium cuprous chloride couple. This gas, now entrapped within the case, accumulates and builds up pressure at the top of the case which causes excess or unabsorbed water to be forced from the case out the inlet opening 9. The expulsion of free water in conduit 7 will occur at a relatively rapid rate since the opening 9 is of substantial size and its flow resistance is relatively low. Water in the column 8 is subjected to the same gas pressure (again assuming column 8 is closed at the bottom), but it escapes therefrom at a relatively slower rate by being fed backwardly through the bibulous separators.

This movement of water in return direction through the separators illustrates a principle of the invention in its simplest aspects. However, where the intended voltage is quite high, the delay attending return of excess water from the column 8 through the separators may be undesirable since intercell electrical leakage will occur as long as the electrodes are bridged at the edges by free liquid. To provide faster drainage of excess water from the column 8, a baffle 15 is provided at the bottom of the case. This baffle normally separates column 8 from column 7, but it is provided with an aperture 28 through which water can flow at a rate somewhat greater than it could flow through the bibulous separators. Baffle 16, similarly installed at the top of the case, is also provided with an aperture 29 which serves to permit escape of air during filling and to equalize gas pressure during expulsion of excess water after filling. Therefore, in the arrangement which is shown in Figure 1, water under accumulated gas pressure in the column 8 is free to pass downwardly through the aperture 28, then through the opening 9, as well as to feed back through the separators as it will, depending upon the relative porosity of the separators and also on the hydrostatic head of water which may exist momentarily in the column 8 while column 7 is virtually empty.

While the gas pressure developed in the case after wetting of the cells is entirely adequate to expel free or excess water from the waterways 7 and 8, the gas is incapable of forcing the water of saturation from the separators wherein it is held by absorption and adsorption.

Of course, if the separators are freely porous to water movement when saturated, then the additional outlet at the bottom of column 8 may be omitted, but since separator porosity is generally related to separator size or thickness, a battery constructed to be of minimum volumetric size will inherently not have separators of a freely porous nature.

There are modifications of the invention which, in view of the principles which have been discussed, readily will be envisaged by those skilled in the art. For special purposes, valves acting conjointly under the power furnished by the dimple motor may be used to control flow through the apertures in the several baffles. Attention is invited to the copending application of Melvin F. Chubb et al., Serial No. 508,206, filed May 13, 1955, for "Electrolytic Battery Assembly," wherein valves and valve-actuating devices of types other than the trigger battery and dimple motor disclosed herein but suitable for use in the practice of the present invention are disclosed and claimed in detail.

Having described my invention, I claim:

1. An immersion type battery, comprising a plurality of cells arranged facially adjacent one another in substantial peripheral alignment in a stack, each cell comprising a positive electrode, a negative electrode, and a thin pad of bibulous separator material between said electrodes, means substantially blocking the peripheries of said cells against entrance of liquid electrolyte to the bibulous separators thereof except at substantially opposed edgewise areas of the peripheries thereof, manifold means common to all the first of the opposed unblocked edgewise areas, the cells for admitting electrolyte to the bibulous separators thereof, manifold means common to all the second of the respective unblocked edgewise areas of the cells to receive air expelled from the separators as they become saturated with electrolyte entering through the first manifold means, one of said manifolds having an inlet thereto arranged adjacent the bottom of said stack of cells, the other of said manifolds having an outlet therefrom arranged adjacent the top of said stack of cells, and normally open valve means including a valve actuator so positioned as to be operated to closed position after the said cells have been activated with electrolyte admitted through said inlet upon immersion of the battery in electrolyte, for closing the said outlet means thereby causing entrapment of gas attending normal activation of the cells to effect expulsion of excess electrolyte back through the inlet of the manifold whence the electrolyte entered.

2. The method of activating a battery cell having a cuprous chloride positive electrode, a magnesium negative electrode, and a thin pad of bibulous separator material therebetween so as to avoid entrapment of air in the interstices thereof, which method comprises blocking edgewise portions of the separator except at substantially opposed portions on the peripheries thereof against entrance of water, flowing water to the separator, for activation of the cell, through one of the unblocked portions on the periphery thereof such that the water may pass freely into and through the separator along a path in the plane thereof toward the other of said unblocked portions, and subsequently closing the said latter portion such that normal gassing of the cell in consequence to its activation causes expulsion of excess electrolyte reversely through the path whence it entered.

3. The method of activating a battery cell having a positive electrode, a negative electrode, and a thin pad of bibulous separator material therebetween so as to avoid entrapment of air in the separator, which method comprises sealing edgewise portions of the separator except at substantially opposed portions on the peripheries thereof, admitting a copious supply of liquid electrolyte to the separator, for rapid activation of the cell, through one of said opposed portions, such that the electrolyte may pass freely into and through the separator along a path in the plane thereof toward the other of said unsealed portions and subsequently closing the said other of said unsealed portions such that normal gassing of the cell in consequence to its activation causes expulsion of unabsorbed electrolyte reversely through the path whence it entered.

4. An immersion battery, comprising a substantially water-tight case having a plurality of cells arranged facially adjacent one another therein, each cell having a positive electrode, a negative electrode, and a bibulous pad of separator material therebetween, the edgewise portions of the cells being spaced from the case along two relatively opposed edges thereof so as to provide continuous passages constituting waterways, the edges of the cells intermediate the said opposed edges being substantially closed by said case against entrance of water to said bibulous separators, the case having an inlet aperture at the bottom thereof communicating with one of said waterways and having an outlet aperture at the top thereof in communication with the other of said waterways, the second of said waterways being in communication with the said inlet and outlet openings through apertures of restricted size, a valve for closing the said outlet opening, and a valve actuator including a water activatable battery installed in the second of said waterways adjacent the said outlet opening.

5. An immersion type battery, comprising a stack of cells arranged facially adjacent one another in serial electrical interconnection, each cell comprising a positive and a negative electrode and a bibulous pad therebetween whereby each cell is activated when the bibulous separator is wetted with electrolyte, means for furnishing electrolyte to said bibulous separators comprising a manifold in common communication with all of the separators along edgewise portions thereof and having an inlet opening adjacent the bottom of said stack, whereby electrolyte admitted to the conduit through the inlet opening may be fed into and absorbed by the bibulous separators of the stacked cells through the edgewise portions of said cells which are in communication with said manifold, a second manifold in common communication with all of said bibulous separators at portions of the peripheries thereof relatively opposed to the portions at which the bibulous separators are in communication with the first manifold, the second manifold having an outlet opening adjacent the top of said stack of cells which opening is normally open to permit escape of air, and valve means for automatically closing said outlet opening after said cells have been wetted with electrolyte so as to entrap gas liberated from the cells in consequence of activation thereof and thereby effect expulsion of unabsorbed and excess electrolyte from both of said manifolds through the inlet opening at the bottom of said stack.

6. An immersion type battery, comprising a substantially water-tight elongated case which is substantially rectangular in cross section, a plurality of cells stacked facially adjacent one another in said case, each cell comprising a positive electrode, a negative electrode, and a pad of bibulous separator material therebetween, each of the cells being of such width that it substantially bridges the case from the inside face of one side wall to the inside face of the opposite side wall, the cells being of such length that their ends are spaced inwardly from the inside faces of the intermediate side walls of the case whereby continuous passages constituting waterways are provided along the cells at the opposed edges of the same, the case having inlet and outlet openings respectively located at the top and bottom of said case and each communicating with the first of said waterways, baffles containing flow-controlling apertures separating the first of said waterways from the second, a water-activatable battery positioned at that end of the case which is normally the top end when the case is immersed in water, and a valve including means operable upon operation of said latter battery for closing at least one of the said openings other than said inlet opening whereby to entrap within the case gas which is liberated in consequence to activation thereof and thereby cause expulsion of excess water from the bibulous separators by passage of water therethrough in a direction generally opposite to the direction whence it entered.

7. An immersion type battery, comprising a stack of cells arranged in serial electrical connection, each cell having a positive and negative electrode and a bibulous separator therebetween which after wetting with electrolyte is adapted to activate the cell, a manifold which is in common communication with edgewise portions of the bibulous separators of the cells in said stack, a second manifold communicating with the edgewise portions of said pads approximately in opposed relation to the first in respect to the peripheries of said separators, means for blocking edgewise portions of said separators residing between said manifolds against entrance of electrolyte to said bibulous separators therethrough, the first of said manifolds having an inlet opening at one end thereof normally conforming to the bottom of said stack of cells, the second of said manifolds having an outlet opening at the end thereof normally conforming to the top of said stack of cells, whereby when the assembly is immersed in electrolyte, the same is caused to flow hydrostatically into the first manifold thence through the separators along paths generally parallel to the planes thereof into the second manifold, and valve means for closing the outlet opening of the second manifold whereby unabsorbed electrolyte is expelled to return out the inlet opening under the gas pressure which is provided through normal gassing of the cells in consequence to their activation by the electrolyte.

References Cited in the file of this patent

UNITED STATES PATENTS

| | | |
|---|---|---|
| 481,664 | Engledue | Aug. 30, 1892 |
| 2,322,210 | Adams | June 22, 1943 |
| 2,594,879 | Davis | Apr. 29, 1952 |
| 2,639,306 | Fischbach | May 19, 1953 |